No. 643,671. Patented Feb. 20, 1900.
C. F. MITZIMBERG.
WATERING TROUGH.
(Application filed Oct. 14, 1899.)
(No Model.) 2 Sheets—Sheet 1.
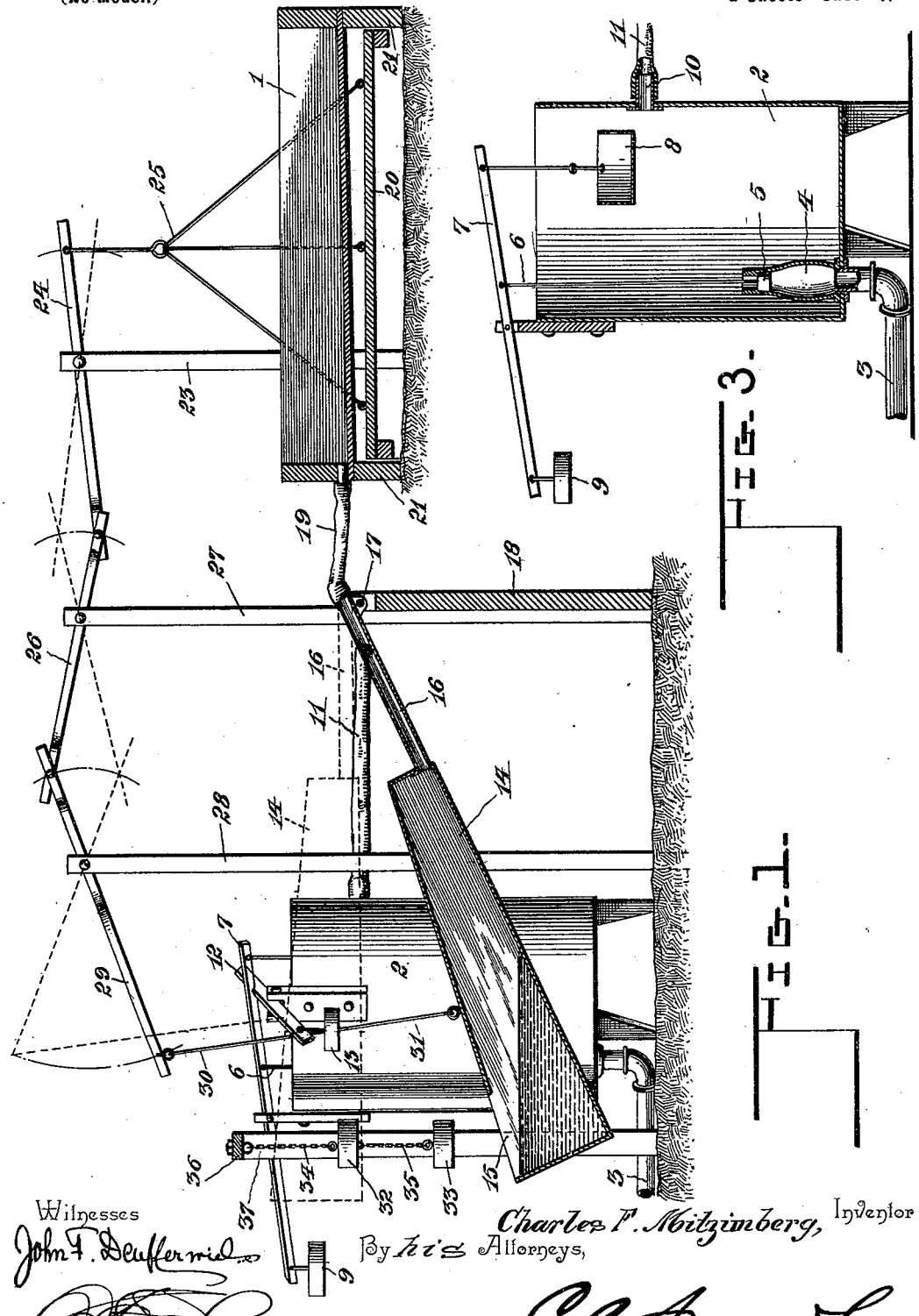
Witnesses
Charles F. Mitzimberg, Inventor
By his Attorneys,

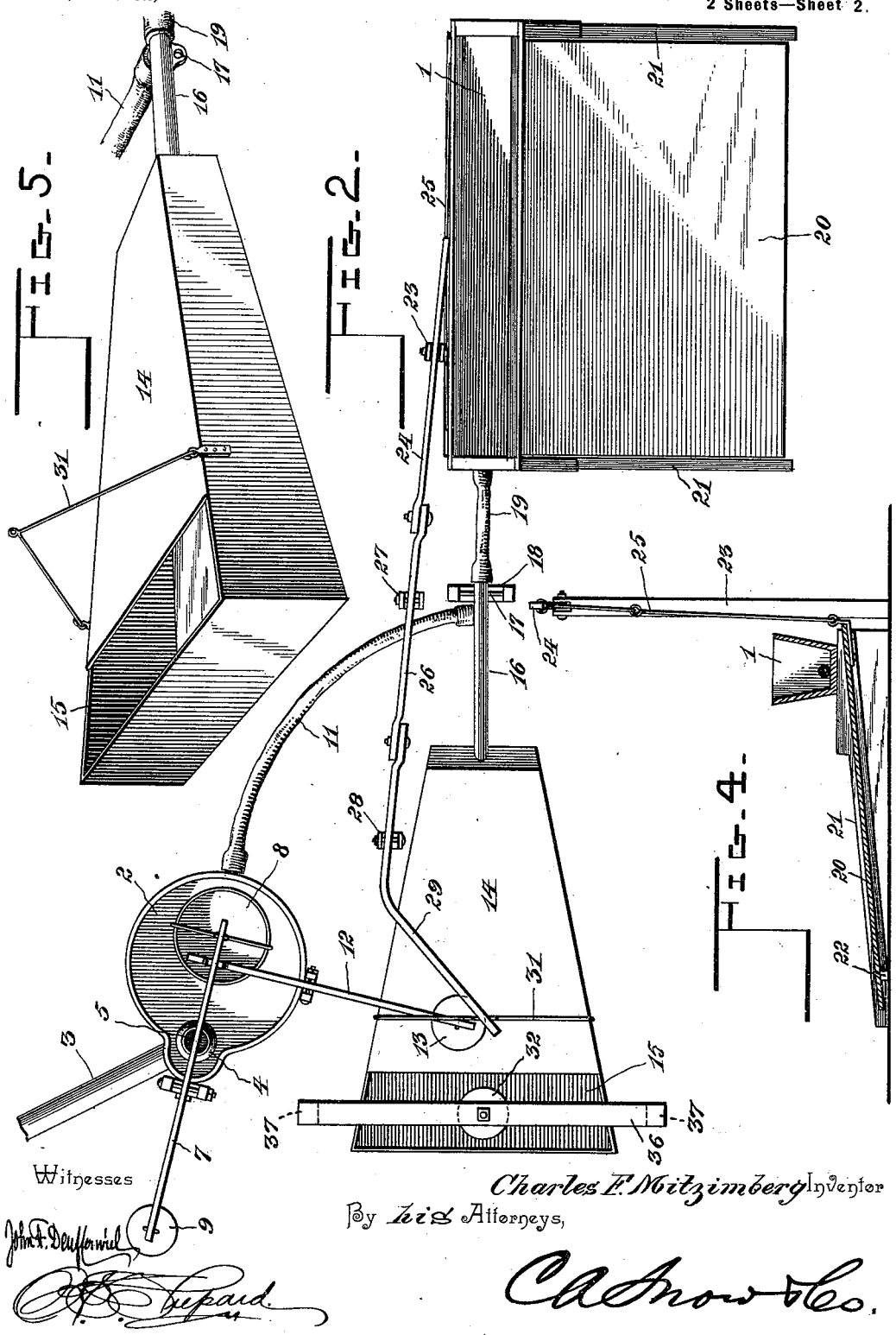

UNITED STATES PATENT OFFICE.

CHARLES FRANKLIN MITZIMBERG, OF SCOTLAND COUNTY, MISSOURI.

WATERING-TROUGH.

SPECIFICATION forming part of Letters Patent No. 643,671, dated February 20, 1900.

Application filed October 14, 1899. Serial No. 733,632. (No model.)

*To all whom it may concern:*

Be it known that I, CHARLES FRANKLIN MITZIMBERG, a citizen of the United States, residing in the county of Scotland, in the State of Missouri, have invented a new and useful Watering-Trough, of which the following is a specification.

This invention relates to watering-troughs, and has for its object to provide improved means whereby water may be automatically supplied to the trough by the animal approaching to drink therefrom and the water also drained from the trough after the animal has receded therefrom, so as to prevent the water from freezing therein. It is furthermore designed to drain the excess water into a storage-tank and to again supply the same water to the trough, so as not to waste any water, and to mount the storage-tank for automatically opening the main supply of water to the trough when the water in the tank has been exhausted and to cut off the supply when the trough is filled, thereby to maintain the required amount of water in the trough and to prevent the same from being overflowed.

To these ends the present invention consists in the combination and arrangement of parts, as will be hereinafter more fully described, shown in the accompanying drawings, and particularly pointed out in the appended claims, it being understood that changes in the form, proportion, size, and minor details may be made within the scope of the appended claims without departing from the spirit or sacrificing any of the advantages of the invention.

In the drawings, Figure 1 is a longitudinal sectional view of a watering-trough constructed in accordance with the present invention. Fig. 2 is a top plan view thereof. Fig. 3 is a detail vertical sectional view of the supply-tank. Fig. 4 is a transverse sectional view illustrating the mounting of the platform for operating the storage-tank. Fig. 5 is a detail perspective view of the storage-tank.

Corresponding parts in the several figures of the drawings are designated by like characters of reference.

Referring to the accompanying drawings, 1 designates a trough of any preferred construction and is designed to contain the water for the animals to drink, said tank being filled and drained through the operation of the present invention.

In carrying out my invention I provide a supply-tank 2, which receives its supply of water from a pond or other suitable source by means of a pipe 3, discharging through the bottom of the tank. Located within the tank and projecting upwardly from the discharge end of the pipe 3 is a substantially-conical valve-chamber 4, containing a valve 5, which is provided with an upright valve-rod 6, connected at its upper end to a lever 7, fulcrumed intermediate of its opposite ends upon the upper end of the tank. The inner end of this lever is provided with a weighted float 8, adapted to be raised and elevated by the water contained within the tank, and having a weight 9 at its opposite outer end to cause the lever to work more quickly and positively. The valve-rod 6 is connected to the lever at a point intermediate of the fulcrum and the inner end thereof, so that when the float rises and the inner end of the lever is elevated thereby the valve will be drawn upwardly within the valve-casing to close the upper discharge end thereof, as clearly illustrated in Fig. 3 of the drawings. Near the upper end of the tank there is provided a discharge-opening 10, from which the water is conveyed to the drinking-trough by means of a suitable pipe 11.

In order that the supply of water may be normally cut off, so as to prevent overflowing of the trough, there is provided a trip-lever 12, fulcrumed upon the top of the tank and at substantially right angles to the valve-lever, having its inner end located beneath the inner portion of the latter and provided at its outer end with a weight 13 for normally elevating the inner end of the trip-lever, and thereby holding the inner end of the valve-lever elevated to close the valve.

To supply the drinking-trough with water, the trip-lever is operated, as will be hereinafter described, to depress the lower end thereof, and thereby free the valve-lever, which will tilt downwardly by reason of the weight of the float 8, thereby opening the valve 4 and permitting the water to run into the tank. When the level of the water reaches the discharge-opening 10, it will flow through the pipe 11 into the trough, and the latter will be prevented from becoming overflowed by reason of the float 8 rising with the water, and thereby cutting off the supply. It will be understood that the valve does not close until after a predetermined quantity of water has been supplied to the trough.

From the foregoing description it is apparent that the trough would remain filled with water, which would become frozen during the winter, and to obviate this disadvantage I provide a storage-tank 14 for receiving the water from the trough after the animal has finished drinking, so as to entirely drain the trough and also to actuate the trip-lever for turning on the supply of water. This tank is best shown in Fig. 5 of the drawings and is substantially triangular in shape, having its narrowest end located next to the trough, and provided with an opening 15 in its top and at its rear end. The forward end is provided with a pipe 16, which is pivotally or hingedly mounted, as at 17, to a suitable standard or support 18, so that the tank is capable of a vertical movement upon its hinged or pivoted connection as a center, and the outer end of the pipe 16 is connected to the trough by means of a flexible pipe 19, so as to accommodate for the movement of the rigid pipe. Thus it will be understood that when the storage-tank is in its lowermost position the water within the trough will drain through the pipes 19 and 16 into the tank, thereby preventing the water from standing in the trough after the animal has finished drinking. As best shown in Fig. 1, the bottom of the trough is inclined downward toward the tank, so as to facilitate the draining off of the water. It is preferable to connect the pipe 11 from the supply-tank to the pipe 16 at a point in rear of the pivot thereof and also to employ a flexible pipe, so that the latter may move with the storage-tank, and thereby drain the water from the said pipe 11 when the storage-tank is in its lowermost position.

As hereinbefore set forth, the storage-tank is adapted to actuate the trip-lever 12, and therefore the outer end of the latter is located in the path of the tank, so that as the tank rises it will contact with the lever and trip it, so as to open the main supply of water, as will be best understood by reference to Figs. 1 and 2.

To actuate the storage-tank, I provide a tilting platform 20, which is located between the opposite base extensions 21 of the trough and mounted upon a rock-bar 22, journaled at opposite ends in the inner sides of the respective supports 21. By reference to Fig. 4 it will be seen that the platform inclines upwardly beneath the trough and projects at the opposite side thereof. Located adjacent to the elevated end of the platform is a suitable upright 23, carrying at its upper end a lever 24, pivoted intermediate of its ends and adapted to swing in a vertical direction. Pendent from the outer end of the lever is a suitable link connection 25 with the elevated end of the platform 20, and the opposite inner end of the lever is pivoted to the adjacent end of another lever 26, which is pivoted intermediate of its ends upon a second upright 27. Adjacent to one side of the storage-tank is a third upright 28, carrying a lever 29, pivoted intermediate of its ends and pivotally connected to the adjacent end of the lever 26. Pendent from the outer free end of the lever 29 is a link 30, which is connected at its lower end to a swinging bail 31, provided upon the upper side of the storage-tank. By reason of the operative connection between the tilting platform and the storage-tank it will be understood that when an animal steps upon the platform it will be depressed, thereby drawing downward upon the outer end of the adjacent lever 24, which operates the other levers to swing in the direction shown by dotted lines and throws the outer free end of the last lever upward, thereby drawing the rear end of the storage-tank upward into the position shown by dotted lines in Fig. 1 and discharging the water contained therein into the trough. When the tank has reached its most elevated position and after it has discharged the water contained therein, the upper side thereof comes in contact with the outer weighted end of the trip-lever 12, thus freeing the valve-lever 7, as hereinbefore described, and opening the valve 5 to supply the tank 2 and the trough with more water. After the animal finishes drinking and passes off of the platform the weight of the storage-tank will cause it to resume its original position, thereby releasing the trip-lever, which is thrown upwardly by its weight 13, and contacting with the inner end of the valve-lever 7 elevates the latter and closes the valve to cut off the supply of water, and thereby prevent overflowing of the trough. It will of course be understood that as the storage-tank is resuming its original position the water remaining in the trough will drain into the tank, as hereinbefore set forth. Thus it will be apparent that the device operates automatically both to turn on and cut off the supply of water, so as to maintain a proper amount of water in the trough and also to prevent the latter from being overflowed. Furthermore, the trough is automatically drained, so as to prevent water from standing therein and becoming frozen.

As best illustrated in Fig. 2, it will be seen that the last lever 29 has its outer free end bent laterally across the top of the storage-tank, so as to connect with the central portion of the bail 31, and each lever is pivoted nearest to the same relative end—that one toward the trough—so that a slight depression of the elevated end of the platform will result in a much greater swing of the outer free end of the lever 29, so as to elevate the storage-tank to the desired level.

In order that the storage-tank may be positively and quickly depressed after the tilting platform has been released, I provide superposed weights 32 and 33, respectively, which are suspended by means of flexible connections 34 and 35, respectively, from a suitable frame structure 36, having an upright support 37, located at each end of the frame and at opposite sides of the storage-tank, as best shown in Fig. 2. This frame straddles the rear end of the tank, so that the weights are alined with the opening 15 in the top of the tank, and as the latter is elevated the weights are received within the opening, the lowermost weight contacting first with the bottom of the tank and finally the other weight, thereby increasing the weight of the tank and insuring a positive and quick return thereof to its original position. It is preferable to suspend the lower weight from the upper one, as clearly shown in Fig. 1; but they may be arranged side by side, as desired.

The supply-tank and the storage-tank are designed to be housed, so as to prevent freezing of the water therein and may be placed in an excavation and located below the freezing-line, in which event the connections between the tanks and the trough will be longer, according to the distance between the latter and the tanks.

Having thus described the invention, what is claimed, and desired to be secured by Letters Patent, is—

1. The combination with a watering-trough, of a source of supply discharging directly into the trough, and an independent storage-tank connected to the trough and draining the latter.

2. The combination with a watering-trough, of a source of supply discharging directly into the trough, and an independent storage-tank connected to the trough, and having a vertical movement for draining the trough, and means for elevating and depressing the tank.

3. The combination with a watering-trough, of a source of supply discharging directly into the trough, and an independent storage-tank connected to the trough, and means for automatically draining the water from the trough into the storage-tank, and also for returning the water from the tank to the trough.

4. The combination with a watering-trough, having a tilting platform, of a storage-tank connected to the trough and having a vertical movement, and an operative connection between the platform and the tank, substantially as and for the purpose set forth.

5. The combination with a watering-trough, having a tilting platform, of a storage-tank, connected to the trough, and mounted to swing in a vertical direction, and a series of pivotally-connected levers forming an operative connection between the tilting platform and the storage-tank, for elevating the latter, substantially in the manner shown and described.

6. The combination with a watering-trough, of a storage-tank, having a rigid discharge-pipe pivotally or hingedly mounted to permit of a vertical movement of the tank, a flexible pipe connection between the outer end of the rigid pipe and the trough, and means for elevating and depressing the tank, substantially as and for the purpose set forth.

7. The combination with a watering-trough, of a storage-tank, having a vertical movement, and connected to the trough, flexibly-suspended superposed weights located in the path of the tank, and means for elevating and depressing the latter, substantially as and for the purpose set forth.

8. The combination with a watering-trough, of a storage-tank, having a vertical movement, connected to the trough, and provided with an opening in its upper side, flexibly-suspended superposed weights located in the path of the tank, and alined with the opening therein, and means for elevating and depressing the tank, substantially as and for the purpose set forth.

9. The combination with a watering-trough, of a vertically-movable storage-tank connected thereto, a supply-tank also connected to the trough, a cut-off valve for the supply-tank, a trip-lever for the cut-off valve, and located in the path of the storage-tank, and means for elevating and depressing the latter, substantially as and for the purpose set forth.

10. The combination with a watering-trough, of a vertically-movable storage-tank, having a flexible connection with the trough, a supply-tank, having a flexible connection with the storage-tank, a cut-off valve for the supply-tank, a trip-lever for the cut-off valve and located in the path of the storage-tank, and means for elevating and depressing the latter, substantially as and for the purpose set forth.

11. The combination with a watering-trough, of a storage-tank having a vertical movement, and connected with the trough, a supply-tank also connected to the trough, a cut-off valve for the supply-tank, a lever fulcrumed upon the latter, and having a float located within the tank, and also connected to the cut-off valve, a trip-lever mounted upon the supply-tank, having one end located in the path of the storage-tank, and the opposite end normally engaging the valve-lever, and holding the valve closed, and means for elevating and depressing the storage-tank, substantially as and for the purpose set forth.

12. The combination with a watering-trough, having a tilting platform, of a supply-tank, a cut-off valve therefor, a valve-lever fulcrumed upon the tank, and provided with a float, a trip-lever also mounted upon the tank and normally engaging the valve-lever and holding the valve closed, a vertically-movable storage-tank connected to the trough, and traveling across the trip-lever, uprights supporting pivotally-connected levers, the outer free end of one lever being connected to the elevated end of the tilting platform, and the outer free end of one of the other levers being connected to the storage-tank, and flexibly-suspended superposed weights located in the path of the storage-tank, substantially as and for the purpose set forth.

13. The combination with a watering-trough, of a source of supply discharging directly into the trough, having means for controlling the supply of water, a storage-tank draining the trough, and means for automatically returning the drained water to the trough, prior to the discharge from the source of supply.

14. The combination with a watering-trough, of a vertically-movable storage-tank, having a rigid discharge-pipe pivotally or hingedly mounted, and a flexible pipe connection between the outer end of the rigid pipe and the trough, a source of supply having a flexible discharge-pipe connected to the rigid pipe of the storage-tank, and means for elevating and depressing the latter.

15. The combination with a watering-trough, of a source of supply discharging directly into the trough, a vertically-movable storage-tank draining the trough, and returning the drain-water to the latter, operating means for elevating the tank, and means for increasing the weight of the latter during the discharge of the drain-water.

In testimony that I claim the foregoing as my own I have hereto affixed my signature in the presence of two witnesses.

CHARLES FRANKLIN MITZIMBERG.

Witnesses:
PETER G. CARTER,
J. M. DAVIS.